United States Patent [19]
Ohno

[11] Patent Number: 5,381,702
[45] Date of Patent: Jan. 17, 1995

[54] HYBRID ELECTRO-MECHANICAL-HYDRAULIC DRIVE SYSTEM, AND METHOD OF OPERATING SAME

[75] Inventor: Mitsumasa Ohno, Isehara, Japan
[73] Assignee: Moog Inc., East Aurora, N.Y.
[21] Appl. No.: 119,868
[22] Filed: Sep. 10, 1993
[30] Foreign Application Priority Data
  Sep. 11, 1992 [JP] Japan ................. 4-243079
[51] Int. Cl.6 .............. F16H 25/20; B29C 45/77
[52] U.S. Cl. ................. 74/89.15; 74/424.8 B; 254/98; 425/145; 425/146
[58] Field of Search ............ 74/89, 89.15, 424.8 B; 425/145, 146, 149; 254/98; 318/481

[56] References Cited
U.S. PATENT DOCUMENTS 3,314,107 4/1967 Honstrater ............. 425/146
3,825,235 7/1974 Schwertfeger et al. ....... 425/146
5,092,753 3/1992 Kumamura et al. ......... 425/145
5,102,587 4/1992 Kumamura et al. ........ 425/145 X
5,217,725 6/1993 Inaba et al. ............. 425/145

Primary Examiner—Allan D. Herrmann
Attorney, Agent, or Firm—Phillips, Lytle, Hitchcock, Blaine & Huber

[57] ABSTRACT

An electro-mechanical-hydraulic drive mechanism (10) for moving a lead (11) relative to a support (12) includes an electric motor-driven element (14) and a hydraulic reaction element (15). The two elements are arranged mechanically in series between the lead and the support. The motor-driven element may be operated independently of the reaction element to move the lead relative to the support when the reaction element is held at a fixed displacement. The two elements may be operated cooperatively to move the load when the motor-driven element is operated at a controlled velocity to pressurize the reaction element, and the reaction element is operated by controlling its pressure.

8 Claims, 1 Drawing Sheet

HYBRID ELECTRO-MECHANICAL-HYDRAULIC DRIVE SYSTEM, AND METHOD OF OPERATING SAME

TECHNICAL FIELD

The present invention relates generally to the field of drive systems for machines, and, more particularly, to an improved hybrid electro-mechanical-hydraulic drive system for injection molding equipment.

BACKGROUND ART

It has heretofore been common practice to drive injection molding machines hydraulically. This has required expensive, large, long-stroke cylinders to provide the travel and high force required. Such cylinders have also required accompanying high-pressure, high-flow, hydraulic power supplies, and servovalves that could control flow and pressure over a wide range.

Lower cost, but still high-performance, electro-mechanical drives using brushless DC servomotors are now replacing hydraulics in many industrial applications. However, the injection molding application has proven especially difficult for this transition because of the need for a combination of controlled velocity under varying loads (to which electro-mechanical drives are well-suited), and the precisely-programmed build-up of high force at extremely low velocities during the mold packing phase of the process (to which the hydraulic drive is well-suited).

The present invention addresses this need by combining the best features of both electro-mechanical and hydraulic drives, but without requiring an expensive hydraulic power supply. This is accomplished by arranging an electro-mechanical screw drive actuator in series with a hydraulic actuator, so that the resulting hybrid electro-mechanical-hydraulic actuator thus formed can operate at a low, controlled velocity to develop tile hydraulic pressure, which is in turn controlled by a servovalve.

The prior art is believed to contain many examples which combine electro-mechanical and hydraulic drives, either in series or parallel with one another. Many of these are believed to be used for press applications. Typically, the electric drive is used to provide rapid advance at low load to a working position, at which point pressure from a pump is applied to a hydraulic cylinder to create high force with very little movement. Upon information and belief, the prior art does not contemplate the use of the electro-mechanical drive to create the pressure required by the hydraulic actuator.

DISCLOSURE OF THE INVENTION

The present invention broadly provides an improved drive mechanism for moving a load relative to a support, and an improved method of operating such a drive mechanism.

With parenthetical reference to the corresponding parts, portions or surfaces of the disclosed embodiment, merely for purposes of illustration and not by way of limitation, the improved drive mechanism (10) is adapted to move a load (11) relative to a support (12). The improved mechanism broadly includes an electric motor-driven element (14) and a hydraulic reaction element (15). The hydraulic reaction element is arranged mechanically in series with the motor-driven element between the load and the support. The motor-driven element is capable of being operated independently of the hydraulic reaction element to move the load relative to the support when the hydraulic reaction element is held at a fixed displacement. The motor-driven element and the hydraulic reaction elements arc capable of being operated cooperatively with one another to move the load when the motor-driven element is operated at a controlled velocity to pressurize the hydraulic reaction element and the hydraulic reaction element is operated by controlling the resulting pressure.

In another aspect, the invention provides an improved method of operating a drive mechanism (10) having an electric motor-driven element (14) and a hydraulic reaction element (15) arranged mechanically in series between a load (11) and a support (12). In one aspect, the improved method comprises the steps of: commanding a desired motion of the load relative to the support, holding the hydraulic reaction element at a fixed displacement, and operating the motor-driven element in accordance with such commanded motion; thereby to move the load relative to the support.

In another aspect, the improved method comprises the steps of commanding a desired reaction (i.e., force, torque, etc.) between the load and the support, operating the motor-driven element at a controlled velocity to pressurize the hydraulic reaction element, and controlling the pressure in the hydraulic reaction element, thereby to control the reaction between the load and the support.

Accordingly, the general object of the invention is to provide an improved drive mechanism for moving a load relative to a support.

Another object is to provide an improved method of operating a drive mechanism for moving a load relative to a support.

Another object is to provide an improved electro-mechanical-hydraulic drive mechanism having an electric motor-driven element and a hydraulic reaction element arranged mechanically in series between a load and a support.

Another object is to provide an improved electro-mechanical-hydraulic drive mechanism in which a motor-driven element is capable of being operated independently of a hydraulic reaction element to move a load relative to a support when the hydraulic reaction element is held in a fixed displacement.

Still another object is to provide an improved drive mechanism having a motor-driven element and a hydraulic reaction element, and wherein the two elements are capable of being operated cooperatively with one another to move the load when the motor-driven element is operated at a controlled velocity to pressurize the hydraulic reaction element and the hydraulic reaction element is operated by controlling its pressure.

These and other objects and advantages will become apparent from the foregoing and ongoing written specification, the drawings, and the appended claims.

DESCRIPTION OF THE PREFERRED EMBODIMENT

Figure 1:
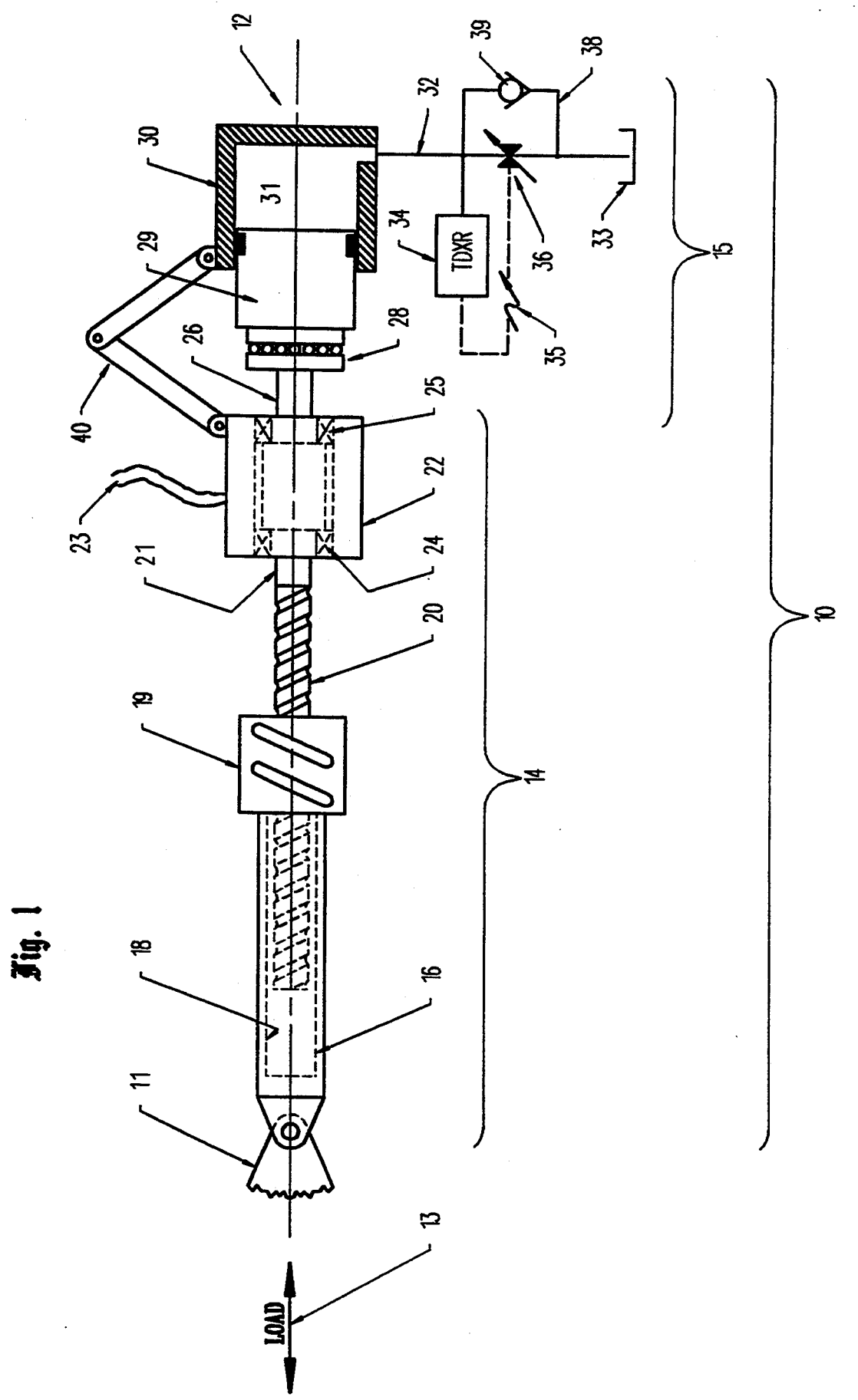
FIG. 1 is a schematic view of the improved electro-mechanical-hydraulic drive system according to the present invention.

At the outset, it should be clearly understood that like reference numerals are intended to identify the same structural elements, portions or surfaces consistently throughout the drawing figure, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIG. 1, the improved electro-mechanical-hydraulic control system, generally indicated at 10, is shown as being operatively arranged between a leftward movable load 11 and a rightward fixed or stationary support 12. The load 11 is shown as being mounted for horizontal movement in either direction, as indicated by the bi-directional nature of arrow 13. The load is restrained from rotational movement relative to the support by suitable means (not shown).

The improved drive mechanism is shown as broadly including an electric motor-driven element, generally indicated at 14, and a hydraulic reaction element, generally indicated at 15. These two elements are arranged mechanically in series between the load and the support.

The motor-driven element 14 is shown as having a horizontally-elongated rod 16 provided with a blind axial hole 18 extending leftwardly into the rod from its right end face, a recirculating ball nut 19, a screw 20 having an intermediate portion passing through the ball nut and having its leftward marginal end portion arranged within rod hole 18, a shaft 21, and an electrical motor 22. Motor 22 is provided with electrical power through flexible conductors 23. The motor has internal bearings, indicated at 24,25, by which the rotor and shaft are mounted for rotation relative to the outer stator or housing. Another coaxial shaft 26 is shown as extending rightwardly from the motor, and engages a thrust bearing 28 arranged on the left end of a piston 29 operatively arranged for sealed sliding movement within a cylinder 30. The position of the piston relative to the cylinder defines a variable-volume chamber 31, which communicates via conduit 32 with a fluid sump or return 33. The position of the piston relative to the cylinder also determines the length of the reaction element.

A pressure transducer 34 is arranged to sense the pressure in chamber 31 and conduit 32 and is arranged to supply an analog signal to an electrical controller 35 for selectively operating a valve 36 in conduit 32. A branch conduit 38 in parallel with valve 36 contains a check valve 39 to permit fluid to be drawn from the sump into chamber 31 when the volume of chamber 31 increases. A linkage, generally indicated at 40, engages the cylinder and the motor to prevent relative rotation therebetween, while permitting relative axial movement between the cylinder and the motor.

As previously noted, the electric motor-driven element broadly includes rod 16, ball nut 19, screw 20 and servomotor 24. The hydraulic reaction element broadly includes piston 29, cylinder 30, conduit 32, pressure transducer 34, controller 35, valve 36 and check valve 39.

The improved drive mechanism is particularly suited or adapted for use with injection molding machines, which require a controlled velocity advance against a varying load, followed by a controlled build-up of high force at very low velocity. In other words, in such applications, it is desired to drive the machine in accordance with a predetermined velocity program to inject molten plastic material into the mold (not shown). In this mode of operation, the fluid in hydraulic reaction chamber 31 is trapped by closing valve 36, and the pressure in chamber 31 will rise and fall in reaction to the screw force as the plastic is injected.

After the mold has been initially filled, it may be desired to apply additional pressure to "pack" the mold while the plastic solidifies. This is preferably done by increasing the pressure at a slow, predetermined rate, and by holding it for a set time. Since the electro-mechanical servo cannot perform this function very well, a different control mode is introduced. According to this alternative control mode, the electro-mechanical servo is commanded to drive at a fixed slow velocity, and a pressure-control servoloop is activated to cause the sensed cylinder pressure to respond to a programmed command. The cylinder pressure can be controlled by selectively opening bleed valve 36 as the fixed velocity of the electro-mechanical drive tends to reduce the volume of chamber 31. As the bleed valve is closed down to throttle the steady back-drive flow out of the cylinder, pressure can be built up to a level necessary to produce the desired packing force. The electric motor must develop the torque necessary to react this force, but at a constant velocity which is substantially greater than would be needed if the hydraulic piston were not backing away. Present state-of-the-art servomotors can perform well under this requirement.

Thus, the improved drive system may operate in either of two modes. To initially advance the load relative to the support, such as during the mold filling operation, valve 36 is closed to prevent fluid from flowing from reaction chamber 31. This fixes the position of piston 29 relative to cylinder 31, and hence fixes the displacement of the hydraulic reaction element. At the same time, motor 22 is operated in accordance with a supplied program, to selectively advance the rod and load as determined by the program. After the mold has been filed, motor 22 is commanded to rotate shaft 21 relative to the motor body at a slow constant velocity. As the advancing load encounters increasing resistance, the pressure in actuator chamber 31 will rise. The amount of force exerted by the drive system on the load relative to the support can be controlled by selectively opening valve 36 so as to control the pressure in actuator chamber 31.

The improved electro-mechanical-hydraulic servo may thus be thought of as providing the hydraulic power necessary to allow use of a hydraulic servoactuator to control force at very low velocity, but without the necessity of providing a separate hydraulic pumping system.

Modifications

The present invention contemplates that many changes and modifications may be made. For example, while the illustrated form is shown as moving the load linearly relative to the support, it is also contemplated and possible to implement an rotational version of such a drive system. The relative positions of the electric motor-driven element and the hydraulic reaction element may be reversed as desired. A hydraulic motor could be connected in series between the electric motor and the screw by means of a differential gear mechanism. Linkage 40 could be replaced by a simple key-keyway connection.

Therefore, while the presently-preferred form of the improved hybrid electro-mechanical-hydraulic drive system has been shown and described, and several modifications thereof discussed, persons skilled in this art will readily appreciate that various additional changes and modifications may be made without departing from the spirit of the invention, as defined and differentiated by the following claims.

What is claimed is:

1. A drive mechanism arranged to move a load relative to a support, comprising:
   an electric motor-driven element;
   a hydraulic reaction element arranged mechanically in series with said electric motor-driven element between said load and support;
   said electric motor-driven element being operated independently of said hydraulic reaction element to move said load relative to said support when said hydraulic reaction element is held at a fixed displacement;
   said electric motor-driven element and said hydraulic reaction element being operated cooperatively with one another to move said load when said motor-driven element is operated at a controlled velocity to pressurize said hydraulic reaction element and said hydraulic reaction element is operated by controlling its pressure.

2. A drive mechanism as set forth in claim 1 wherein said motor-driven element includes a rod, a ball nut, a screw and an electrical motor.

3. A drive mechanism as set forth in claim 1 wherein said reaction element includes a piston mounted for scaled siding movement within a cylinder and defining a variable-volume chamber.

4. A drive mechanism as set forth in claim 3 and further comprising a conduit communicating said chamber with a fluid sump, and an electrically-operated valve arranged in said conduit for controlling the pressure in said chamber.

5. A drive mechanism as set forth in claim 4 and further comprising a pressure transducer operatively arranged to sense the pressure of fluid in said chamber and operatively arranged to control the operation of said valve.

6. A drive mechanism as set forth in claim 4 and further comprising a check valve arranged in parallel with said electrically-operable valve for permitting fluid to flow from said sump to said chamber when the volume of said chamber increases.

7. The method of operating a drive mechanism having an electric motor-driven element and a passive hydraulic reaction element arranged mechanically in series between a load and a support, comprising the steps of:
   commanding a pressure in said reaction element proportional to a desired reaction force between said load and support;
   operating said motor-driven element at a controlled velocity to pressurize said reaction element;
   sensing the actual pressure in said reaction element; and
   controlling the pressure in said reaction element as a function of the algebraic sum of such command and actual pressures.

8. The method as set forth in claim 7 wherein the step of controlling the pressure in said element includes the steps of:
   selectively venting said element through an electrically-operated valve; and
   operating said valve to control the pressure in said element.

* * * * *